US011106879B2

(12) United States Patent
Farhan et al.

(10) Patent No.: US 11,106,879 B2
(45) Date of Patent: Aug. 31, 2021

(54) MULTILINGUAL TRANSLATION DEVICE AND METHOD

(71) Applicant: SAMSUNG ELECTRONICS CO., LTD., Suwon-si (KR)

(72) Inventors: Wael Farhan, Amman (JO); Analle Abuammar, Amman (JO); Bashar Talafha, Irbid (JO)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 324 days.

(21) Appl. No.: 16/390,317

(22) Filed: Apr. 22, 2019

(65) Prior Publication Data

US 2019/0332677 A1 Oct. 31, 2019

(30) Foreign Application Priority Data

Apr. 30, 2018 (KR) ........................ 10-2018-0050206

(51) Int. Cl.

*G06F 40/58* (2020.01)
*G06F 40/51* (2020.01)
*G06F 40/45* (2020.01)
*G06F 40/44* (2020.01)
*G06F 40/242* (2020.01)
*G06F 40/289* (2020.01)
*G06F 40/263* (2020.01)

(52) U.S. Cl.

CPC ............ *G06F 40/58* (2020.01); *G06F 40/242* (2020.01); *G06F 40/263* (2020.01); *G06F 40/289* (2020.01); *G06F 40/44* (2020.01); *G06F 40/45* (2020.01); *G06F 40/51* (2020.01)

(58) Field of Classification Search

CPC .......... G06F 40/58; G06F 40/51; G06F 40/45; G06F 40/44; G06F 40/242; G06F 40/263; G06F 40/289
USPC ............................................................... 704/2
See application file for complete search history.

(56) References Cited

U.S. PATENT DOCUMENTS 9,098,488 B2 8/2015 Hamid et al.
10,672,293 B2 * 6/2020 Labutov .................. G06F 40/30
2006/0190241 A1 * 8/2006 Goutte .................... G06F 40/45 704/2
2009/0094017 A1 * 4/2009 Chen ....................... G06F 40/45 704/3

(Continued)

FOREIGN PATENT DOCUMENTS

JP 5555542 B2 7/2014

OTHER PUBLICATIONS

Dong et al., "Multi-Task Learning for Multiple Language Translation", Association for Computational Linguistics, 2015, pp. 1723-1732 (10 pages total).

(Continued)

*Primary Examiner* — Edwin S Leland, III
(74) *Attorney, Agent, or Firm* — Sughrue Mion, PLLC

(57) ABSTRACT

A multilingual translation device and method. The multilingual translation device may obtain a multilingual sentence, obtain vector values corresponding to words included in the multilingual sentence by using a multilingual translation model, convert the obtained vector values into vector values corresponding to a target language, and obtain a sentence in the target language, based on the vector values corresponding to the target language.

18 Claims, 8 Drawing Sheets

(56) References Cited

U.S. PATENT DOCUMENTS

| | | | | |
|---|---|---|---|---|
| 2015/0127373 | A1* | 5/2015 | Li | G06F 40/51<br>705/2 |
| 2016/0350288 | A1* | 12/2016 | Wick | G06F 40/242 |
| 2017/0011031 | A1* | 1/2017 | Tashiro | G06F 16/243 |
| 2017/0147558 | A1* | 5/2017 | Kim | G06F 40/263 |
| 2018/0307679 | A1* | 10/2018 | Duong | G06F 40/242 |
| 2018/0314689 | A1* | 11/2018 | Wang | G10L 15/07 |
| 2019/0197119 | A1* | 6/2019 | Zhang | G06F 40/58 |
| 2019/0332677 | A1* | 10/2019 | Farhan | G06F 40/242 |

OTHER PUBLICATIONS

Zoph, B and Knight, K., “Multi-Source Neural Translation”, Information Sciences Institute, Department of Computer Science, University of South California, 2016, (5 pages total).

Johnson et al., “Google’s Multilingual Neural Machine Translation System: Enabling Zero-Shot Translation”, Transactions of the Association for Computational Linguistics, vol. 5, Oct. 2017, pp. 339-352 (14 pages total).

Ha et al., “Toward Multilingual Neural Machine Translation with Universal Encoder and Decoder”, Institute for Anthropomatics and Robotics KIT—Karlsruhe Institute of Technology, 2016, (7 pages total).

* cited by examiner

| | SENTENCES DIVIDED FROM MONOLINGUAL CORPUS | SECOND SENTENCES | |
|---|---|---|---|
| 811 | I'm going to **school** | I'm going to **école** | 821 |
| | | I'm going to **colegio** | |
| | | I'm going to **scuola** | |
| 812 | This **car** is very expensive | This **voiture** is very expensive | 822 |
| | | This **coche** is very expensive | |
| | | This **auto** is very expensive | |
| 813 | Je t' **écris** une lettre | Je t' **write** une lettre | 823 |
| | | Je t' **escribir** une lettre | |
| | | Je t' **scrivere** une lettre | |
| 814 | Ce **chien** est mignon | Ce **dog** est mignon | 824 |
| | | Ce **perro** est mignon | |
| | | Ce **cane** est mignon | |

| **English** | **French** | **Spanish** | **Italian** |
|---|---|---|---|
| dog | chien | perro | cane |
| school | école | colegio | scuola |
| meat | viande | carne | carne |
| write | écrire | escribir | scrivere |
| car | voiture | coche | auto |
| ⋮ | ⋮ | ⋮ | ⋮ |

MULTILINGUAL TRANSLATION DEVICE AND METHOD

CROSS-REFERENCE TO RELATED APPLICATION(S)

This application is based on and claims priority under 35 U.S.C. § 119(a) from Korean Patent Application No. 10-2018-0050206, filed on Apr. 30, 2018, in the Korean Intellectual Property Office, the disclosure of which is incorporated by reference herein in its entirety.

BACKGROUND

1. Field

The disclosure relates to methods and devices for translating a multilingual sentence.

2. Description of Related Art

Deep machine learning is a technique for automatically extracting key features from a large amount of data by using an artificial neural network created by imitating the human brain, and performing various operations such as recognition, generation, inference, etc., based on the extracted features.

In particular, deep machine learning has recently been used for translation, such as, translation from one language (e.g., Korean language) to another language that is different from the one language (e.g., English). In this respect, neural machine translation (NMT) is being developed. NMT is a translation method performed by taking into account an entire sentence, instead of being performed on units of phrases of the sentence as in many conventional statistical machine translation (SMT) methods. In NMT, a computer may repeatedly learn one or more optimal results among translation results of sentences so as to perform natural translation.

In addition, recently, not only is translation of monolingual sentences (i.e., sentences composed of one language) required, but so also is translation of multilingual sentences (i.e., sentences composed of two or more different languages). However, in multilingual sentences, the two or more different languages may be similar semantically and grammaticality. Thus, in order to efficiently and accurately translate a multilingual sentence, there is a need in the art for an improved translation process that is based on considering similarities between the two or more different languages of a multilingual sentence.

SUMMARY

Provided are multilingual translation methods and devices.

Additional aspects will be set forth in part in the description which follows and, in part, will be apparent from the description, or may be learned by practice of the presented embodiments of the disclosure.

According to an embodiment of the disclosure, a multilingual translation device includes a memory storing one or more instructions, and at least one processor configured to execute the one or more instructions stored in the memory. The at least one processor is further configured to, by executing the one or more instructions, obtain a multilingual sentence, obtain vector values corresponding to words included in the multilingual sentence by using a multilingual translation model, convert the obtained vector values into vector values corresponding to a target language, and obtain a sentence in the target language, based on the vector values corresponding to the target language. The multilingual translation model includes a word-vector mapping model mapping corresponding vector values to words included in a first sentence written in a single language and words included in second sentences obtained by translating at least one word among the words of the first sentence into at least one different languages.

The at least one processor may be further configured to, by executing the one or more instructions, create the word-vector mapping model by mapping the corresponding vector values to the words of the first sentence and the words of the second sentences, based on a contextual meaning of the at least one word in the first sentence and contextual meanings of second words, which are obtained by translating the at least one word into at least one different language, in the second sentences.

The at least one processor may be further configured to, by executing the one or more instructions, identify languages corresponding to the words of the first sentence and the words of the second sentences, and create the word-vector mapping model by mapping the corresponding vector values of the words of the first sentence and the words of the second sentences, based on the identified languages.

The at least one processor may be further configured to, by executing the one or more instructions, obtain the first sentence by dividing a monolingual corpus written in the single language into a sentence.

The at least one processor may be further configured to, by executing the one or more instructions, create a translation mapping table mapping words set based on a user input to words obtained by translating the set words into the at least one different language, and create the second sentences by translating at least one word included in the set words among the words of the first sentence into at least one different language by using the translation mapping table.

The at least one processor may be further configured to, by executing the one or more instructions, set languages into which translation is to take place, based on a user input, and create the word-vector mapping model based on the set languages.

The at least one processor may be further configured to, by executing the one or more instructions, set, as the target language, a language different from languages of the multilingual sentence among the set languages.

The at least one processor may be further configured to, by executing the one or more instructions, identify languages corresponding to the words of the multilingual sentence and obtain the vector values corresponding to the words of the multilingual sentence, based on the identified languages.

The at least one processor may be further configured to, by executing the one or more instructions, identify languages corresponding to the words of the multilingual sentence, based on contextual meanings of the words of the multilingual sentence in the multilingual sentence.

In another embodiment, the multilingual translation device may comprise memory storing one or more instructions and at least one processor configured to execute the one or more instructions to: obtain a multilingual sentence, which is a sentence having a first word from a first language and a second word from a second language that is different from the first language, identify the first language corresponding to the first word and identify the second language corresponding to the second word, use a multilingual translation model to: obtain a language-identified sentence that includes information indicating the language of the word for each of the words in the multilingual sentence, and a vector value corresponding to each word of the words in the multilingual sentence. The at least one processor may further convert the obtained vector values into vector values corresponding to a target language and by using a word-vector mapping model included in the multilingual translation model, obtain candidate sentences corresponding to the vector values corresponding to the target language. The word-vector mapping model mapping may correspond vector values to words included in a first sentence written in a single language and words included in second sentences obtained by translating at least one word among the words of the first sentence into at least one different language.

According to another embodiment of the disclosure, a multilingual translation method includes obtaining a multilingual sentence; and obtaining vector values corresponding to words included in the multilingual sentence by using a multilingual translation model, converting the obtained vector values into vector values corresponding to a target language, and obtaining a sentence in the target language, based on the vector values corresponding to the target language. The multilingual translation model includes a word-vector mapping model mapping corresponding vector values to words included in a first sentence written in a single language and words included in second sentences obtained by translating at least one word among the words of the first sentence into at least one different language.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a diagram illustrating an example of learning data for creating a word-vector mapping model, according to an embodiment of the disclosure;

FIG. 9 is a diagram illustrating an anchor word translation table according to an embodiment of the disclosure;

DETAILED DESCRIPTION

Figure 1:
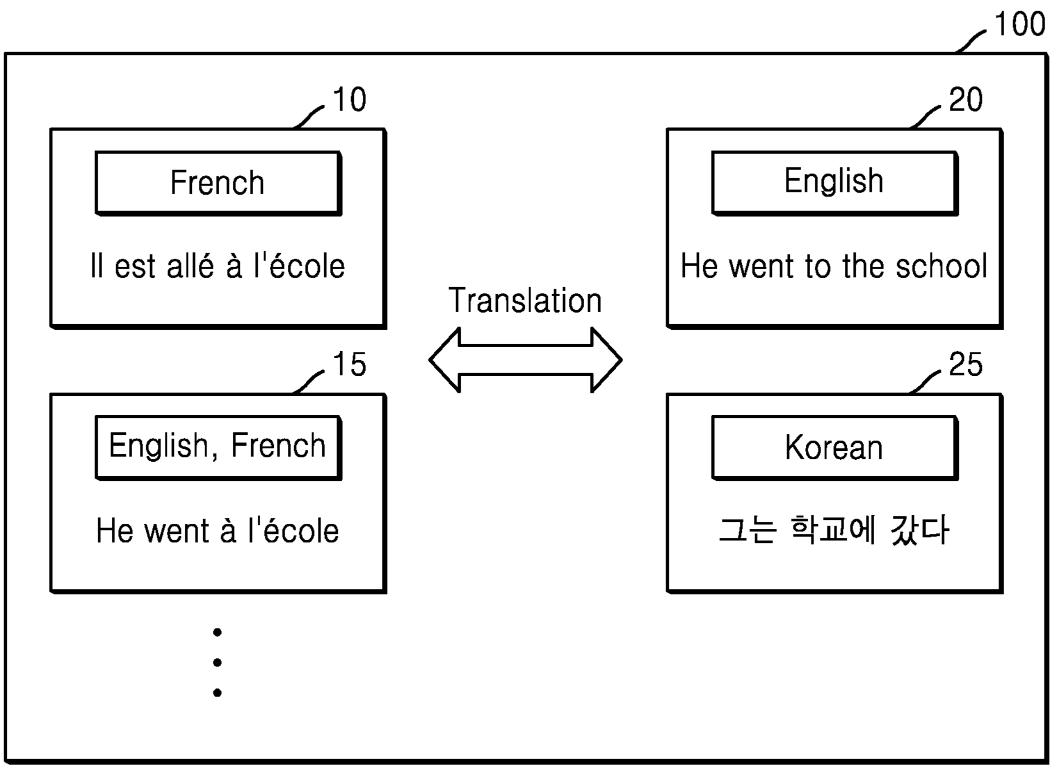
FIG. 1 is a block diagram of a system for translating a multilingual sentence, according to an embodiment of the disclosure.

The principles of the disclosure will be described and embodiments of the disclosure will be set forth herein, so that the scope of the disclosure may be clarified and those of ordinary skill in the art to practice the disclosure. These embodiments of the disclosure may be implemented in various forms.

The same reference numerals denote the same elements throughout the specification. All elements of embodiments of the disclosure are not described herein, and functions or constructions that are well-known in the art or that are redundant in embodiments of the disclosure are omitted herein. As used herein, the term 'module' or 'unit' may be implemented in combination of one or more among software, hardware, and firmware. In embodiments, a plurality of 'modules' or 'units' may form one element or one 'module' or 'unit' may include a plurality of elements. Throughout the disclosure, the expression "at least one of a, b or c" indicates only a, only b, only c, both a and b, both a and c, both b and c, all of a, b, and c, or variations thereof.

Hereinafter, operating principles and embodiments of the disclosure will be described with reference to the accompanying drawings.

FIG. 1 is a block diagram of a system for translating a multilingual sentence according to an embodiment of the disclosure.

FIG. 1 illustrates a multilingual translation model 100 for translating a multilingual sentence into a monolingual sentence, according to an embodiment of the disclosure.

The multilingual sentence may refer to a sentence comprising words from two or more different languages. For example, "He went à l'école" is a multilingual sentence comprising English language words and French language words. In contrast, a monolingual sentence refers to a sentence consisting of monolingual words (i.e., words from the same one language). A sentence consisting of only English language words, such as "He went to the school", is a non-limiting example of a monolingual sentence.

The multilingual translation model 100 may receive a multilingual sentence and translate the multilingual sentence into a monolingual sentence. For example, as illustrated in FIG. 1, the multilingual translation model 100 may translate a sentence 15 "He went à l'école" comprising English and French words into a sentence 20 "He went to the school" consisting of only English words.

Alternatively, the multilingual translation model 100 may translate the sentence 15 "He went à l'école" comprising English and French words into a sentence 25 "그는 학교에 갔다" consisting of only Korean words. As described above, the multilingual translation model 100 may translate a word in the sentence into a language different from a language of the word in the sentence.

Multilingual people often use multilingual sentences as well as monolingual sentences. Thus, there is a need to translate not only monolingual sentences but also multilingual sentences. Existing translation systems are disadvantageous in that, in translation of a multilingual sentence, languages into which the multilingual sentence can be translated are limited to languages included in the multilingual sentence or the multilingual sentence cannot be directly translated into a target language and translation thereof into an intermediate language is required even when languages into which the sentence can be translated are not limited.

In one embodiment of the disclosure, the multilingual translation model 100 is capable of improving a translation process by using similarities between languages to construct a translation model. Sentences in different languages may be similar semantically and grammaticality. Accordingly, a more accurate and efficient translation model may be constructed using similarities between different languages.

In one embodiment of the disclosure, the multilingual translation model 100 may be a multilingual translation device. The multilingual translation device may be embodied as, but is not limited to, various devices or servers such as a smart phone, a tablet PC, a laptop computer, a wearable multilingual translation device (wearable device), a desktop computer, an electronic book terminal, a digital broadcasting terminal, a personal digital assistant (PDA), a navigation device, a digital audio player, such as, an MP3 (Moving Picture Experts Group (MPEG)-1 Audio Layer III) player, or the like.

Alternatively, the multilingual translation model 100 may be embodied as a combination of a multilingual translation device and a server. Otherwise, a multilingual translation device to which a user input is input and a translation server may be separately provided, and translation may be performed through communication between the multilingual translation device and the translation server. Alternatively, translation may be performed by a multilingual translation device of a terminal, and embodiments of the disclosure are not limited to the above examples.

For convenience of explanation, a method of translating a multilingual sentence, performed by a "multilingual translation device", will be described herein. However, some or all of operations of the multilingual translation device which will be described below may be performed by a server or may be performed partially by a plurality of multilingual translation devices.

Figure 2:
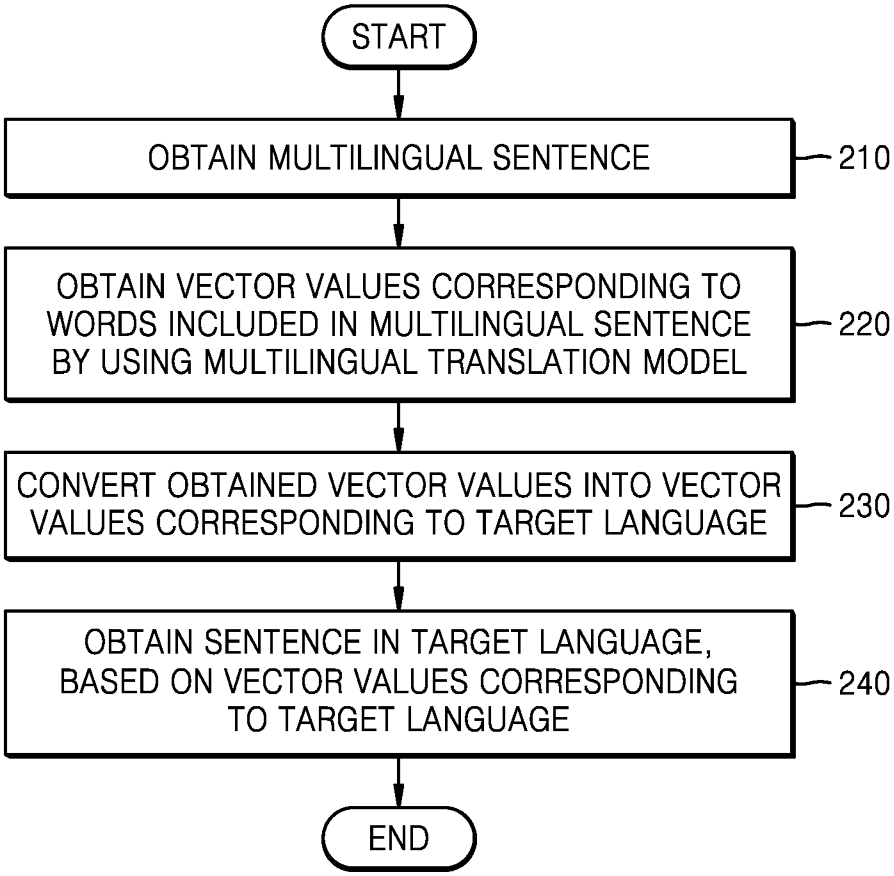
FIG. 2 is a flowchart of a method of translating a multilingual sentence into a sentence in a target language, according to an embodiment of the disclosure.

FIG. 2 is a flowchart of a method of translating a multilingual sentence into a sentence in a target language according to an embodiment of the disclosure.

Referring to FIG. 2, in operation 210, a multilingual translation device may obtain a multilingual sentence.

The multilingual translation device may obtain the multilingual sentence to translate a multilingual sentence comprising words of two or more different languages into a sentence comprising only words in a target language.

In one embodiment of the disclosure, the multilingual translation device may receive the multilingual sentence from the outside. For example, the multilingual translation device may receive the multilingual sentence from a terminal of a user based on user input. Alternatively, the multilingual translation device may extract the multilingual sentence from text contained in data, which is stored in the multilingual translation device or created by the multilingual translation device.

In operation 220, the multilingual translation device may obtain vector values corresponding to words included in the multilingual sentence by using a multilingual translation model.

In one embodiment of the disclosure, the multilingual translation model may include a word-vector mapping model, and the multilingual translation device may obtain the vector values corresponding to the words included in the multilingual sentence by using the word-vector mapping model.

The word-vector mapping model is a model mapping words to vector values corresponding to the words. A vector value corresponding to a certain word may be a value of a word embedding vector. The word embedding vector may be a vector corresponding to a certain location on a hyper-dimensional space to include various information regarding the word.

For example, each word included in a sentence may be represented by a 300-dimensional real vector value corresponding thereto. The number '300' is merely an example, the vector value may have any number of dimensions sufficient to contain various information regarding the words included in the sentence, and the value of dimensions of each of the words may be determined by the information regarding each of the words.

In one embodiment of the disclosure, the word-vector mapping model may be a model mapping corresponding vector values to words included in a first sentence written in a single language and words included in second sentences obtained by translating at least one of the words of the first sentence into at least one different language. The creation of the word-vector mapping model will be described with reference to FIG. 7 below.

In one embodiment of the disclosure, the multilingual translation device uses a multilingual translation model to identify a language corresponding to each word included in a multilingual sentence and to obtain a vector value corresponding to each word included in the multilingual sentence, based on the identified language. In one embodiment of the disclosure, the language corresponding to each word included in the multilingual sentence may be identified based on a contextual meaning of each word of the multilingual sentence. The word-vector mapping model is a model mapping words to vector values corresponding thereto, in consideration of a language corresponding to each word. Accordingly, a process of identifying a language corresponding to each word included in a multilingual sentence may be needed so that the multilingual translation device may obtain a vector value corresponding to each word included in the multilingual sentence by using the word-vector mapping model.

In operation 230, the multilingual translation device may convert the obtained vector values into vector values corresponding to the target language.

In one embodiment of the disclosure, the multilingual translation device may convert the vector values corresponding to the words included in the multilingual sentence into vector values corresponding to the target language by using the multilingual translation model. Here, the multilingual translation model may include a sequence-to-sequence converter, and the multilingual translation device may convert the vector values corresponding to the words of the multilingual sentence into vector values corresponding to the target language by using the sequence-to-sequence converter.

Sequence-to-sequence conversion may be understood as a translation method in which a translation system using an artificial neural network performs translation by taking into account an entire sentence, i.e., by using mapping between sentences of various lengths instead of using one-to-one lookups between words. The sequence-to-sequence converter may refer to a functional block configured to perform sequence-to-sequence conversion.

In one embodiment of the disclosure, the multilingual translation device may set the target language, based on a user input. Here, a language different from multiple languages in which an input sentence is written may be set as the target language. For example, when the multilingual translation device obtains a sentence written in English and French, the multilingual translation device may set Korean as a target language, based on a user input, and may convert vector values corresponding to words included in the sentence written in English and French into vector values corresponding to Korean.

In one embodiment of the disclosure, the multilingual translation device may obtain a candidate group of vectors corresponding to the target language by converting the vector values corresponding to the words of the multilingual sentence by using the multilingual translation model.

In operation 240, the multilingual translation device may obtain a sentence in the target language, based on the vector values corresponding to the target language.

In one embodiment of the disclosure, the multilingual translation device may obtain the sentence in the target language, based on the vector values corresponding to the target language. The multilingual translation device may obtain words corresponding to the vector values corresponding to the target language by using the word-vector mapping model included in the multilingual translation model, and may obtain the sentence in the target language, based on the obtained words.

In one embodiment of the disclosure, the multilingual translation device may obtain sentences in the target language corresponding to candidates belonging to the candidate group of the vector values corresponding to the target language, and evaluate the obtained sentences in the target language by using a language model (LM). The multilingual translation device may identify a most appropriate sentence from among the sentences in the target language, based on a result of the evaluation. Here, the sentence identified by the multilingual translation device may be considered as a result of translating a source sentence.

Figure 3:
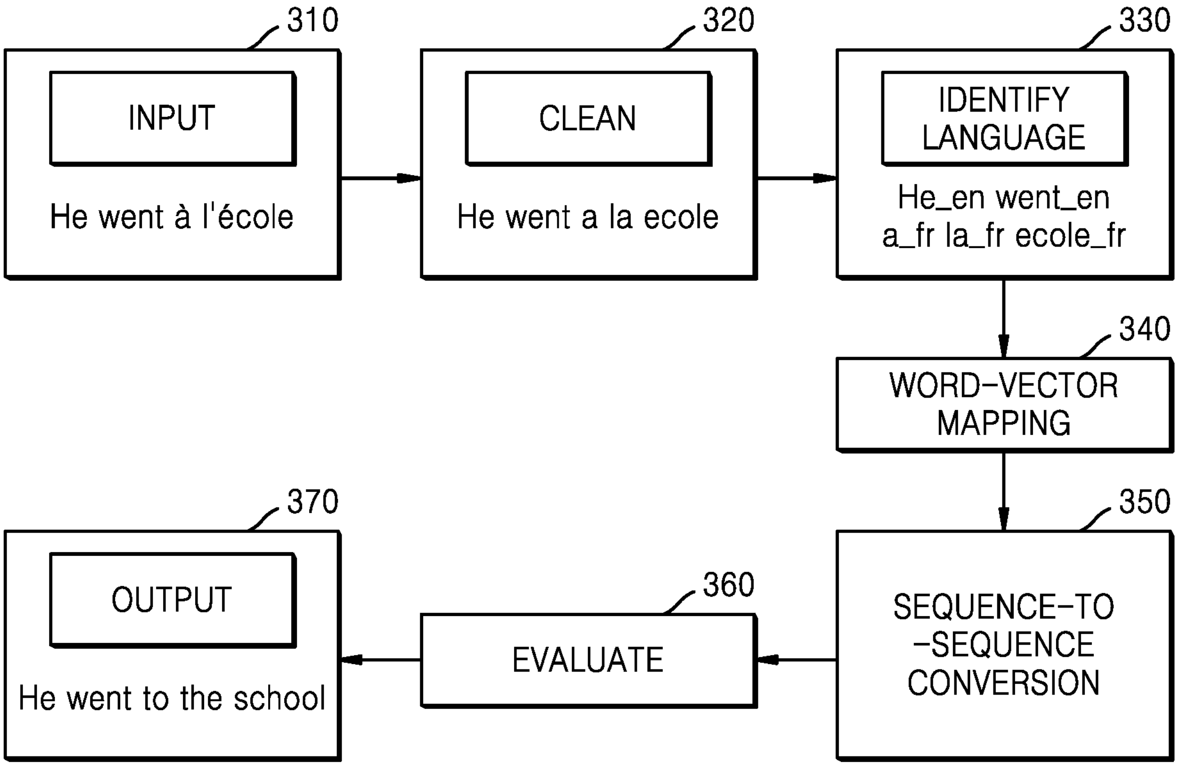
FIG. 3 is a detailed flowchart of a process of translating a multilingual sentence, according to an embodiment of the disclosure.

FIG. 3 is a detailed flowchart of a process of translating a multilingual sentence according to an embodiment of the disclosure.

Referring to FIG. 3, a multilingual translation device may obtain a multilingual sentence 310 "He went à l'école". Here, the multilingual sentence 310 may be input from a user. Alternatively, the multilingual sentence 310 may be stored in the multilingual translation device or extracted from text created by the multilingual translation device.

The multilingual translation device may clean the multilingual sentence 310 "He went à l'école". Here, the cleaning of the multilingual sentence 310 may be understood to include normalizing the multilingual sentence 310, replacing a date, numbers, etc. included in the multilingual sentence 310 with certain tokens, removing diacritical marks included in the multilingual sentence 310, and the like.

The multilingual translation device normalizes "l'école" which is a non-normalized word into "la école" among the words included in the multilingual sentence 310 obtained as a source sentence. Furthermore, the multilingual translation device converts the words "à" and "école" including the diacritical marks among the words of the multilingual sentence 310 obtained as the source sentence into "a" and "ecole" by removing the diacritical marks therefrom. In conclusion, the multilingual translation device may obtain a cleaned sentence 320 "He went a la ecole" by cleaning the multilingual sentence 310 as illustrated in FIG. 3.

The multilingual translation device may identify languages corresponding to words included in the cleaned sentence 320. For example, as illustrated in FIG. 3, the multilingual translation device may identify the languages corresponding to the words of the cleaned sentence 320, and allocate language tags indicating the types of the identified languages to the words of the cleaned sentence 320. A type of language corresponding to English language words "He" and "went" among the words of the cleaned sentence 320 is identified as English, and a type of language corresponding to French language words "a" and "lecole" is identified as French. After the identification of the languages, the multilingual translation device may obtain a language-identified sentence 330 "He_en went_en a_fr lecole_fr" by allocating one of a language tag 'en' indicating English and a language tag 'fr' indicating French to each of the words of the cleaned sentence 320.

The multilingual translation device may obtain vector values corresponding to the words included in the language-identified sentence 330 by using a word-vector mapping model 340. The multilingual translation device may convert the obtained vector values into vector values corresponding to English which is a target language by using a sequence-to-sequence convertor 350. In this case, the multilingual translation device may obtain a candidate group of vector values corresponding to the target language as a result of the conversion.

The multilingual translation device may obtain English language sentences corresponding to candidates belonging to the candidate group of vector values corresponding to the target language (English), and evaluate the English language sentences by using an evaluator 360 that uses a language model. The multilingual translation device may identify a most appropriate sentence among the English language sentences, based on a result of the evaluation. Referring to FIG. 3, the multilingual translation device may output, as a translation result, an output sentence "He went to the school" 370 identified as a most appropriate sentence among the English sentences.

Figure 4:
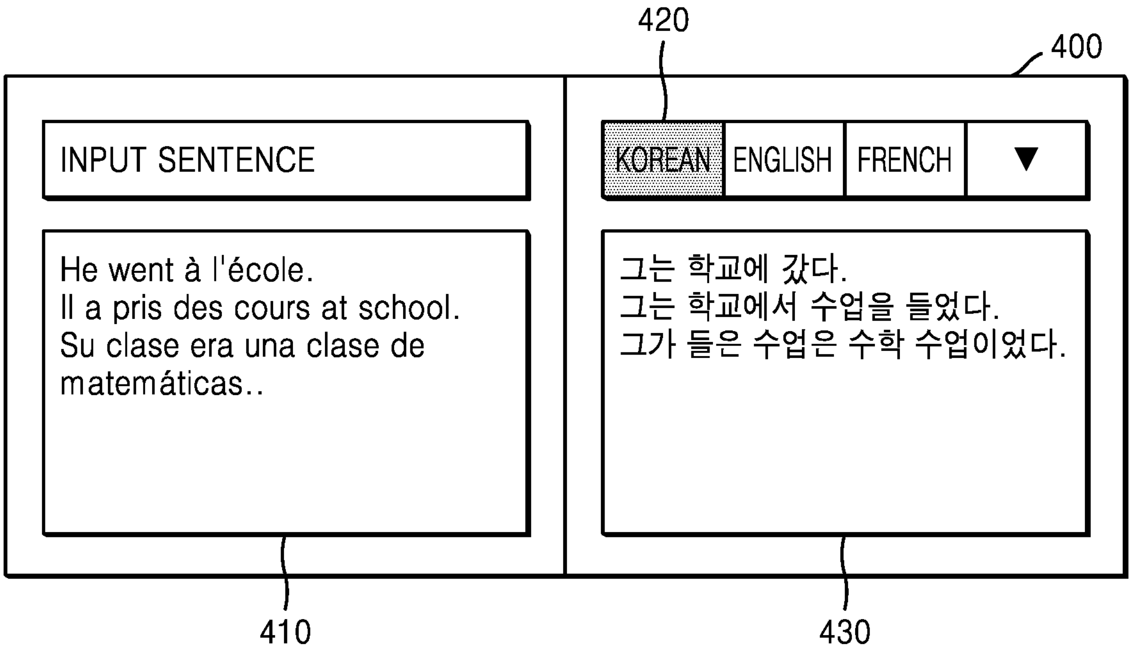
FIG. 4 is a diagram illustrating translation of a multilingual sentence, according to an embodiment of the disclosure.

FIG. 4 is a diagram illustrating translation of a multilingual sentence according to an embodiment of the disclosure.

Referring to FIG. 4, a multilingual translation device may include a display, and may cause the display to display a user interface 400 for multilingual translation on the display. The user interface 400 may include a window 410 for receiving a sentence to be translated, a window 420 for setting a target language, and a window 430 for displaying a translation result.

The multilingual translation device may receive a sentence to be translated from a user, for example, by the user inputting the sentence into the window 410. The multilingual translation device may receive not only a multilingual sentence but also a monolingual sentence. For example, as illustrated in FIG. 4, the multilingual translation device may receive sentences "He went a l'ecole" and "Il a pris des cours at school" written in multiple languages (English and French), receive a sentence "Su clase era una clase de matemáticas" written in a single language (Spanish) as a sentence to be translated, and display the received sentences on the window 410 for receiving a sentence to be translated.

The multilingual translation device may receive an input for setting a target language from the user, and set a target language for translation, based on the received input. The multilingual translation device may receive the input for setting a target language from the user via the window 420 for setting a target language. For example, as illustrated in FIG. 4, the multilingual translation device may receive an input for setting Korean as a target language via the window 420 for setting a target language, and may set Korean as a target language, based on the received input. The set target language may be displayed on the window 420 for setting a target language. The window 420 may include information or buttons corresponding to one or more different languages that can be set as the target language (e.g., in FIG. 4, window 420 includes information or buttons corresponding to Korean, English and French).

The multilingual translation device may translate the received sentences into the target language by using a multilingual translation model. The multilingual translation device may display results of translating the received sentences on the window 430 for displaying a translation result. For example, as illustrated in FIG. 4, the multilingual translation device may display "그는 학교에 갔다", "그는 학교에서 수업을 들었다", and "그가 들은 수업은 수학 수업이었다" which are the results of translating the received sentences on the window 430 for displaying a translation result.

Figure 5:
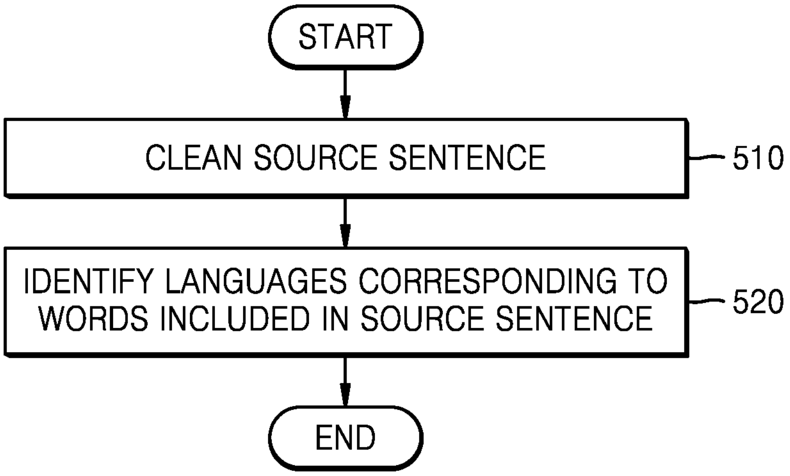
FIG. 5 is a flow diagram of a method of preprocessing a source sentence, according to an embodiment of the disclosure.

FIG. 5 is a flow diagram of a method of preprocessing a source sentence according to an embodiment of the disclosure. The source sentence may refer to a sentence which is input as a sentence to be translated during a translation process. In one embodiment of the disclosure, a multilingual translation device may perform a preprocessing process as a preparation process for translating the source sentence input as the sentence to be translated. The preprocessing process for the sentence may include cleaning the sentence and identifying a language corresponding to each of words contained in the sentence.

Referring to FIG. 5, in operation 510, the multilingual translation device may clean an input multilingual sentence. Here, the cleaning of the sentence may be understood to include one or more of normalizing the sentence, removing diacritical marks from the sentence, replacing a date, numbers, etc. included in the sentence with certain tokens, and the like.

The multilingual translation device may normalize the source sentence. The normalization of the source sentence may refer to converting text included in the source sentence into a single canonical form. For example, when "He went à l'école" is received as a source sentence, the multilingual translation device may normalize "l'école" included in the source sentence into "la école".

The multilingual translation device may remove diacritical marks from the source sentence. For example, when "He went à l'école" is received as a source sentence, the multilingual translation device may obtain "a" and "l'ecole" by removing diacritical marks from "à" and "l'école" including the diacritical marks among the words included in the source sentence.

The multilingual translation device may replace a date, numbers, etc. included in the source sentence with certain tokens. For example, the multilingual translation device may replace the date with 'dat' and the numbers with 'num'.

In conclusion, the multilingual translation device may receive "He went à l'école" as a source sentence, and obtain "He went a la ecole" by cleaning the source sentence.

The multilingual translation device may prepare for translation through the cleaning of the source sentence.

In operation 520, the multilingual translation device may identify languages corresponding to the words included in the input source sentence. Here, the identifying of the languages corresponding to the words included in the source sentence may be understood to mean identifying a type of language corresponding to each of the words, i.e., identifying a language to which each of the words belongs.

In one embodiment of the disclosure, the multilingual translation device may identify languages corresponding to the words included in the source sentence by using a word-language mapping table. For example, when the source sentence includes an English language word "school", the multilingual translation device may identify the language type as English, which is a language mapped to "school" in the word-language mapping table, as a language corresponding to "school".

The multilingual translation device may create the word-language mapping table, based on languages into which translation is to take place according to a user input. For example, when the multilingual translation device sets Korean, English, French, and German as languages into which translation is to take place, based on the user input, the multilingual translation device may create the word-language mapping table by respectively mapping Korean language words, English language words, French language words, and German language words to Korean, English, French, and German, respectively.

The multilingual translation device may create a word-language mapping table for English by using a monolingual corpus (e.g., a dictionary) for each of the set languages into which translation is to take place. For example, the multilingual translation device may create the word-language mapping table by mapping a language corresponding to words included in an English corpus to English.

In one embodiment of the disclosure, the multilingual translation device may identify a language corresponding to each of the words in the source sentence, based on a contextual meaning of each of the words in the source sentence.

It is difficult for the multilingual translation device to identify a language corresponding to a word by using a word-mapping table when the word is used in the same form in a plurality of languages. For example, when a source sentence contains a word "gift", "gift" is a word used in English for "present" and used in German for "poison" and thus it is difficult to identify a language corresponding to "gift" using the word-language mapping table created based on a monolingual corpus.

For a word that is difficult to identify a type of a language corresponding thereto, the multilingual translation device may identify the corresponding language by using a sequence labeling network including bidirectional Long short-term memory (LSTM) layers. The sequence labeling network may receive an entire sentence and identify a language corresponding to each word therein in consideration of a contextual meaning of each word in the sentence.

Figure 6:
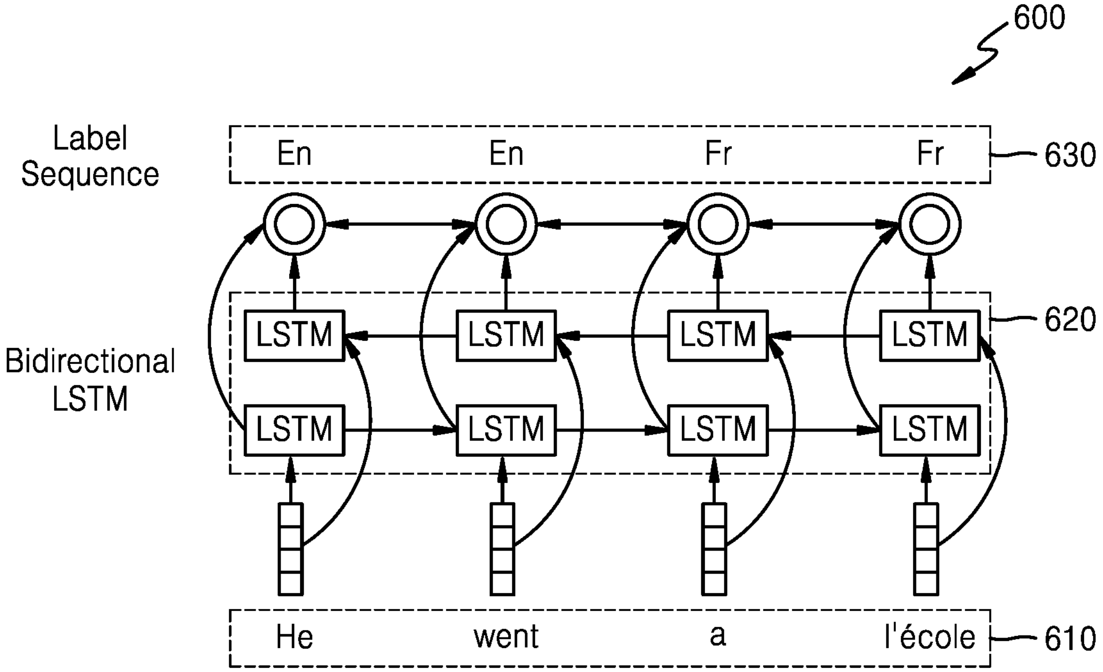
FIG. 6 is a diagram illustrating a sequence labeling network according to an embodiment of the disclosure.

Referring to FIG. 6, a sequence labeling network 600 may include bidirectional LSTM layers 620. The sequence labeling network 600 may receive "He went a l'ecole" which is a source sentence 610, and may identify languages 630 (here, En represents English, and Fr represents French) corresponding to words included in the source sentence 610 by taking into account contextual meanings of the words included in the source sentence 610.

Figure 7:
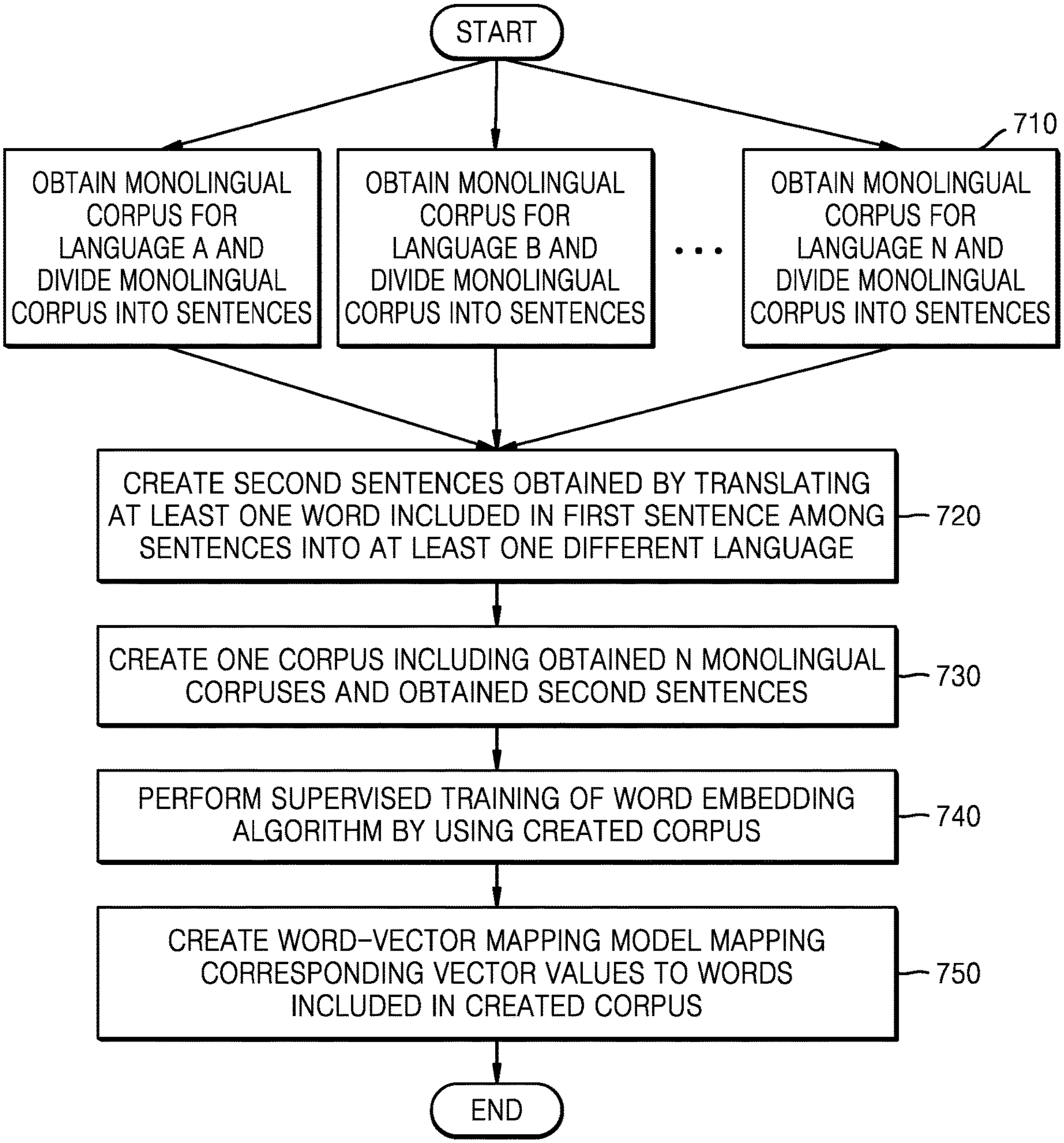
FIG. 7 is a flowchart of a method of creating a word-vector mapping model, according to an embodiment of the disclosure.

FIG. 7 is a flowchart of a method of creating a word-vector mapping model according to an embodiment of the disclosure.

Referring to FIG. 7, in operation 710, a multilingual translation device obtains a monolingual corpus for each of N languages, and divides the monolingual corpus into sentences.

In one embodiment of the disclosure, the N languages may be languages into which translation is to take place, which are set by the multilingual translation device based on a user input. For convenience of explanation, it is assumed in FIG. 7 that English, French, Spanish, and Italian are set as languages available for translation by the multilingual translation device.

In relation to operation 710, FIG. 8 illustrates examples of sentences 810 divided from a monolingual corpus.

For example, referring to FIG. 8, the multilingual translation device may obtain the sentences 810 by dividing an English corpus and a French corpus into sentences. The multilingual translation device may divide the English corpus into sentences “I’m going to school”, “This car is very expensive”, etc., and may divide the French corpus into “Je t’écris une lettre”, “Ce chien est mignon”, etc.

In operation 720, the multilingual translation device creates second sentences by translating at least one word included in a first sentence among the sentences into at least one different language. The at least one word may be an anchor word as described below, but is not so limited and may be one or more words that are different from the anchor word.

The multilingual translation device may create second sentences by translating at least one word included in the first sentence into at least one different language by using an anchor word translation table for anchor words.

The multilingual translation device may set anchor words, based on a user input. A user may set anchor words in the multilingual translation device, in consideration of a frequency of use of words of language users. For example, in the case of a plurality of languages, the user may set, as anchor words, words such as “dog”, “school”, “meat”, “write”, and “car” which are commonly and frequently used by users who use the plurality of languages.

The multilingual translation device may create an anchor word translation table for the set anchor words. The multilingual translation device may create an anchor word translation table by translating the set anchor words into the set languages into which translation is to take place. For example, referring to FIG. 9, the multilingual translation device may create an anchor word translation table 900 by setting “dog”, “school”, “meat”, “write”, “car”, etc. as anchor words, based on a user input, and translating the set anchor words into languages (English, French, Spanish, and Italian) into which translation is to take place.

The multilingual translation device may create second sentences by translating at least one word included in the anchor word translation table among words included in a first sentence into the set languages into which translation is to take place by using the anchor word translation table.

For example, referring to FIG. 8, the multilingual translation device may create second sentences 820 by translating at least one word included in the anchor word translation table among the words included in the sentences 810 divided from the monolingual corpus into the languages (English, French, Spanish, and Italian) into which translation is to take place. The multilingual translation device may create second sentences 821 by translating “school” included in an anchor word translation table 900 among the words included in a sentence “I’m going to school” 811 into the languages (English, French, Spanish, and Italian) into which translation is to take place by using the anchor word translation table 900.

In operation 730, the multilingual translation device creates a corpus including a monolingual corpus for each of the obtained N languages and the second sentences.

In operation 740, the multilingual translation device may perform unsupervised training of a word embedding algorithm by using the created corpus.

The word embedding algorithm is a type of algorithm for embedding words included in source sentences into a vector space by learning the source sentences. Here, word embedding refers to expressing a word as a vector, i.e., mapping the word to a vector value to place the word on the vector space. Representative examples of the word embedding algorithm include word2vec (Google), fasttext (Facebook), etc. The word embedding algorithm may receive a sentence to be learned, and output a vector value corresponding to each word included in the sentence to be learned. That is, the vector values corresponding to the words included in the sentence may be mapped to the words by learning the word embedding algorithm by using the sentence.

The multilingual translation device may perform unsupervised training of the word embedding algorithm by using the created corpus. The unsupervised training may refer to machine learning that does not need an input of a teaching signal (correct answer). The word embedding algorithm may map corresponding vector values to the words included in the sentences constituting the corpus as a result of learning the corpus. Thus, the multilingual translation device may map corresponding vector values to sentences of the monolingual corpus for each of the N languages constituting the created corpus and the words included in the second sentences through supervised training of the word embedding algorithm using the created corpus.

The word embedding algorithm maps words included in sentences to corresponding vector values in learning the sentences, based on the contextual meanings of the words in the sentences. Words at the same position in the same sentence may have the same contextual meaning in the sentence. That is, the contextual meaning of a first word in a sentence including the first word may be the same as that of a second word in a sentence in which the first word is replaced with the second word. This is because, even after the first word is replaced with the second word, the composition of the words in the sentence excluding the second word is the same as that of the sentence before the first word is replaced with the second word. In this case, the word embedding algorithm maps the corresponding vector values to the words in the sentence, based on the contextual meanings of the words in the sentence, so that the first word and the second word of the same contextual meaning may be mapped to close positions in the vector space.

The multilingual translation device may perform unsupervised training of the word embedding algorithm using one corpus including sentences of monolingual corpuses for the N languages and second sentences. In this case, the second sentences are created by translating a first sentence of the monolingual corpus, i.e., by translating an anchor word included in the first sentence into anchor words in other languages. In other words, the second sentences are obtained by replacing the anchor word included in the first sentence with anchor words in other languages. The contextual meaning of the anchor word in the first sentence is the same as those of other-language anchor words included in the second sentences. Therefore, the multilingual translation device may map the anchor word included in the first sentence and words included in the second sentences, which are obtained by translating the anchor word in the first sentence, to close positions in the vector space by training the word embedding algorithm using the first sentence and the second sentences.

For example, the multilingual translation device may train the word embedding algorithm by using the first sentence 811 “I’m going to school” and second sentences 821 “I’m going to école”, “I’m going to colegio”, and “I’m going to scuola”. In this case, the contextual meaning of the anchor word “school” in the first sentence 811 and the contextual meanings of “école”, “colegio”, and “scuola”, which are translated from “school”, in the second sentences 821 are the same. The word embedding algorithm may map the anchor word “school” and the anchor words “école”, “colegio”, and "scuola translated from "school" to close positions in the vector space through learning of the first sentence 811 and the second sentences 821.

In operation 750, the multilingual translation device creates a word-vector mapping model mapping the corresponding vector values to the words included in the created corpus.

The multilingual translation device may create the word-vector mapping model in which the corresponding vector values are mapped to the words included in the created corpus by using a result of unsupervised training the word embedding algorithm using the created corpus.

Figure 10:
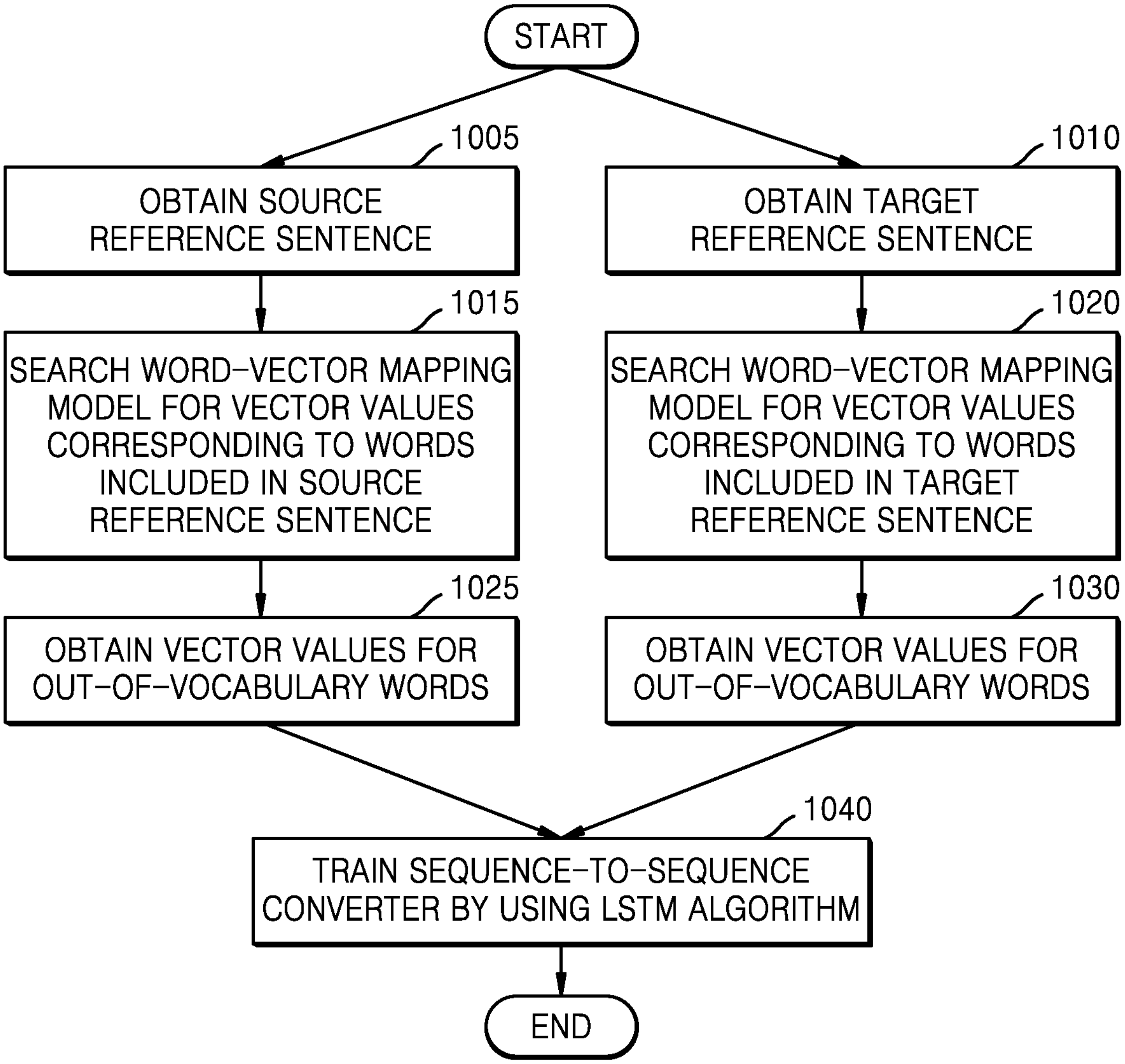
FIG. 10 is a flowchart of a method of training a sequence-to-sequence converter, according to an embodiment of the disclosure.

FIG. 10 is a flowchart of a method of training a sequence-to-sequence converter according to an embodiment of the disclosure.

Referring to FIG. 10, in operation 1005, a multilingual translation device may obtain a source reference sentence. In operation 1010, the multilingual translation device may obtain a target reference sentence. Here, the reference sentences may refer to sentences input to train the sequence-to-sequence converter in a machine translation process using an artificial neuron network.

In operation 1015, the multilingual translation device may search a word-vector mapping model for vector values corresponding to words included in the source reference sentence. In operation 1020, the multilingual translation device may search the word-vector mapping model for vector values corresponding to words included in the target reference sentence. The word-vector mapping model in operations 1015 and 1020 is the same as the word-vector mapping model described above with reference to FIG. 2 and thus is not redundantly described.

In operation 1025, the multilingual translation device may obtain vector values for out-of-vocabulary (OOV) words included in the source reference sentence. In operation 1030, the multilingual translation device may obtain vector values for OOV words included in the target reference sentence. The OOV words may refer to words not included in the word-vector mapping model.

The multilingual translation device may allocate corresponding vector values to OOV words by an n-gram method. The multilingual translation device may predict a vector value corresponding to a word not included in the word-vector mapping model, based on the arrangement of characters constituting this word and vector values corresponding to words of a similar arrangement of characters to the arrangement of characters of this word. For example, the multilingual translation device may assign corresponding vector values to the OOV words through stochastic representation of a chain of n words.

The multilingual translation device may obtain corresponding vector values to all the words included in the source reference sentence and the target reference sentence, in operations 1015 and 1025.

In operation 1040, the multilingual translation device may train the sequence-to-sequence converter by using an LSTM algorithm. The multilingual translation device may train the relationship between the arrangement of the vector values corresponding to the source reference sentence and the arrangement of the vector values corresponding to the target reference sentence through an artificial neuron network. The multilingual translation device may obtain an optimum weight for outputting a target sentence, when a source sentence is input, by inputting a large number of pairs of input sentences and output sentences to the artificial neuron network. The sequence-to-sequence converter trained through the above-described process may be used in the translation process described above with reference to FIGS. 2 and 3.

Although a case in which the sequence-to-sequence converter is trained by the multilingual translation device has been described above for convenience of explanation, it will be apparent to those of ordinary skill in the art that the sequence-to-sequence converter may be trained by a server or another multilingual translation device and the multilingual translation device may use the sequence-to-sequence converter trained by the server of the other multilingual translation device.

Figure 11:
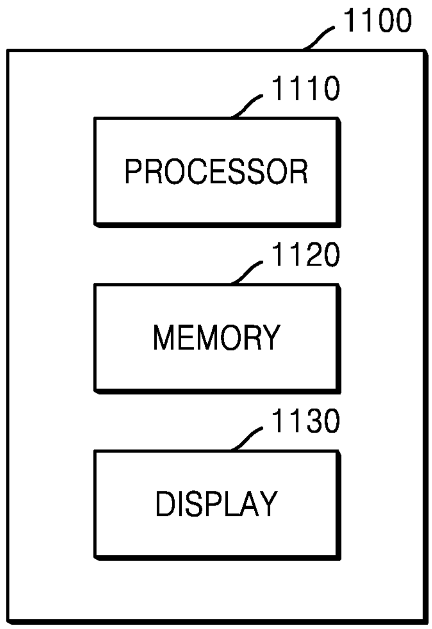
FIG. 11 is a block diagram of a multilingual translation device according to an embodiment of the disclosure.

FIG. 11 is a block diagram of a multilingual translation device according to an embodiment of the disclosure.

A multilingual translation device 1100 of FIG. 11 may perform the methods of FIGS. 2 to 5, 7, and 9 in a time-series manner. Thus, although not described below, the above description regarding the methods of FIGS. 2-5, 7 and 9 also applies to the multilingual translation device 1100.

As illustrated in FIG. 11, in one embodiment of the disclosure, the multilingual translation device 1100 may include a processor 1110, a memory 1120, and a display 1130. However, all the components illustrated in FIG. 11 are not indispensable components of the multilingual translation device 1100. The multilingual translation device 1100 may further include other components, as well as the components illustrated in FIG. 11, or may include only some of the components illustrated in FIG. 11.

For example, the multilingual translation device 1100 may further include an input device (not shown), as well as the processor 1110, the memory 1120, and the display 1130. The multilingual translation device 1100 may receive a multilingual sentence from a user via the input device, and translate the multilingual sentence into a sentence in a target language.

The multilingual translation device 1100 may be included in at least one of a home appliance, a mobile computing device, or a server or may be connected to at least one of the home appliance, the mobile computing device, or the server via wire or wirelessly.

The processor 1110 may be embodied as at least one processor (one or more processors). For example, the processor 1110 may be embodied as an array of logic gates or a combination of a general-purpose microprocessor and a memory storing a program which may be executed in the microprocessor.

The processor 1110 may perform overall control of the multilingual translation device 1100. For example, the processor 1110 may be configured to, by executing instructions stored in the memory 1120 of the multilingual translation device 1100, perform overall control of the multilingual translation device 1100. Furthermore, the processor 1110 may be configured to, by executing the instructions stored in the memory 1120, perform functions of the multilingual translation device 1100 described in FIGS. 2 to 5, 7, and 9.

In detail, the processor 1110 may obtain a multilingual sentence. The processor 1110 may receive the multilingual sentence from the outside. Alternatively, the processor 1110 may obtain the multilingual sentence stored in the multilingual translation device 1100 or obtain the multilingual sentence from text included in data created by the multilingual translation device 110.

The processor 1110 may obtain vector values corresponding to words included in the multilingual sentence. The processor 1110 may use a word-vector mapping model to obtain the vector values corresponding to the words included in the multilingual sentence, the word-vector mapping model mapping corresponding vector values to words included in a first sentence written in a single language and words included in second sentences obtained by translating at least one of the words of the first sentence into at least one different language.

The processor 1110 may convert the vector values corresponding to the words included in the multilingual sentence into vector values corresponding to a target language. The processor 1110 may set the target language, based on a user input. The processor 1110 may use a sequence-to-sequence converter to convert the vector values corresponding to the words included in the multilingual sentence into the vector values corresponding to the target language.

The processor 1110 may obtain a sentence in the target language, based on the vector values obtained through the conversion. The processor 1110 may use the word-vector mapping model to obtain the sentence in the target language, based on the vector values obtained through the conversion.

The processor 1110 may create the word-vector mapping model by mapping the corresponding vector values to the words of the first and second sentences, based on the contextual meaning of at least one word of the first sentence in the first sentence and the contextual meanings of second words, which are obtained by translating the at least one word of the first sentence into at least one different language, in the second sentences obtained by translating at least one word of the first sentence. The processor 1110 may identify languages corresponding to the words of the first and second sentences, and create the word-vector mapping model mapping the corresponding vector values to the words of the first and second sentences, based on the identified languages.

The processor 1110 may obtain the first sentence by dividing a monolingual corpus written in a single language into a sentence.

The processor 1110 may create a translation mapping table mapping words set based on a user input to words obtained by translating the set words into at least one different language. The processor 1110 may create second sentences by translating at least one word included in the set words among the words of the first sentence into at least one different language by using the created translation mapping table.

The processor 1110 may set languages into which translation is to take place, based on a user input. The processor 1110 may create the word-vector mapping model, based on the set languages. The processor 1110 may set, as the target language, a language different from languages of the multilingual sentence among the set languages.

The processor 1110 may identify languages corresponding to the words of the multilingual sentence, and obtain the vector values corresponding to the words of the multilingual sentence, based on the identified languages. The processor 1110 may identify languages corresponding to the words of the multilingual sentence, based on the contextual meanings of the words of the multilingual sentence in the multilingual sentence.

The memory 1120 is hardware storing various types of data processed in the multilingual translation device 1100. For example, the memory 1120 may store instructions for processing and control of the processor 1110, and store data input to or output from the multilingual translation device 1100. Furthermore, the memory 1120 may store user data. For example, the memory 1120 may store a word-vector mapping model created by the method described above with reference to FIG. 7, and store a result of training a sequence-to-sequence converter by the method described above with reference to FIG. 10.

The memory 1120 may include at least one type of storage medium among a flash memory type storage medium, a hard disk type storage medium, a multimedia card micro type storage medium, a card type memory (e.g., SD or XD memory), a random access memory (RAM), a static RAM (SRAM), a read-only memory (ROM), electrically erasable programmable ROM (EEPROM), a programmable ROM (PROM), a magnetic memory, a magnetic disk, or an optical disc.

The instructions stored in the memory 1120 may be classified into a plurality of modules, e.g., the word-vector mapping model, the sequence-to-sequence converter, etc., according to functions.

The display 1130 may display a user interface for multilingual translation. The user interface for multilingual translation may include a window for receiving a sentence to be translated, a window for setting a target language, and a window for displaying a translation result.

A method of operating the multilingual translation device 1100 may be recorded on a non-transitory computer-readable recording medium storing one or more programs including instructions for performing the method. Examples of the non-transitory computer-readable recording medium include magnetic media such as a hard disc, a floppy disk and a magnetic tape, optical media such as a CD-ROM and a DVD, magneto-optical media such as a floptical disk, and hardware devices, such as ROM, RAM, flash memory, etc., which are specially designed to store and execute program instructions. The program instructions include not only machine language codes prepared by a compiler but also high-level language codes executable by a computer using an interpreter or the like.

While embodiments of the disclosure have been described above in detail with reference to the figures, the scope of the disclosure is not limited thereto, and it will be understood by those of ordinary skill in the art that various changes in form and details may be made therein without departing from the spirit and scope as defined by the following claims.

What is claimed is:

1. A multilingual translation device comprising:

a memory storing one or more instructions; and at least one processor configured to execute the one or more instructions to:

obtain a multilingual sentence, which is a sentence comprising a first word from a first language and a second word from a second language that is different from the first language;

obtain vector values corresponding to the first word and the second word, respectively, by using a multilingual translation model, convert at least one of the obtained vector values into at least one target vector value corresponding to a target language, and obtain a sentence in the target language, based on the at least one target vector value corresponding to the target language, wherein the multilingual translation model comprises a word-vector mapping model mapping corresponding vector values to words included in a first sentence written in a single language and words included in second sentences obtained by translating at least one word among the words of the first sentence into at least one different language.

2. The multilingual translation device of claim 1, wherein the at least one processor is further configured to execute the one or more instructions to create the word-vector mapping model by mapping the corresponding vector values to the words of the first sentence and the words of the second sentences, based on a contextual meaning of the at least one word in the first sentence and contextual meanings of second words, which are obtained by translating the at least one word into the at least one different language, in the second sentences.

3. The multilingual translation device of claim 1, wherein the at least one processor is further configured to execute the one or more instructions to identify languages corresponding to the words of the first sentence and the words of the second sentences, and create the word-vector mapping model by mapping the corresponding vector values of the words of the first sentence and the words of the second sentences, based on the identified languages.

4. The multilingual translation device of claim 1, wherein the at least one processor is further configured to execute the one or more instructions to obtain the first sentence by dividing a monolingual corpus written in the single language into a plurality of sentences.

5. The multilingual translation device of claim 1, wherein the at least one processor is further configured to execute the one or more instructions to create a translation mapping table mapping words set based on a user input to words obtained by translating the set words into the at least one different language, and create the second sentences by translating at least one word included in the set words among the words of the first sentence into the at least one different language by using the translation mapping table.

6. The multilingual translation device of claim 1, wherein the at least one processor is further configured to execute the one or more instructions to set languages into which translation is to take place, based on a user input, and create the word-vector mapping model based on the set languages.

7. The multilingual translation device of claim 6, wherein the at least one processor is further configured to execute the one or more instructions to set, as the target language, a language different from languages of the multilingual sentence among the set languages.

8. The multilingual translation device of claim 1, wherein the at least one processor is further configured to execute the one or more instructions to identify languages corresponding to the words of the multilingual sentence and obtain the vector values corresponding to the words of the multilingual sentence, based on the identified languages.

9. The multilingual translation device of claim 8, wherein the at least one processor is further configured to execute the one or more instructions to identify the languages corresponding to the words of the multilingual sentence, based on contextual meanings of the words of the multilingual sentence in the multilingual sentence.

10. A multilingual translation method comprising:

obtaining a multilingual sentence which is a sentence comprising a first word from a first language and a second word from a second language that is different from the first language;

obtaining vector values corresponding to the first word and the second word, respectively, by using a multilingual translation model;

converting at least one of the obtained vector values into at least one target vector value corresponding to a target language; and obtaining a sentence in the target language, based on the at least one target vector value corresponding to the target language, wherein the multilingual translation model comprises a word-vector mapping model mapping corresponding vector values to words included in a first sentence written in a single language and words included in second sentences obtained by translating at least one word among the words of the first sentence into at least one different language.

11. The multilingual translation method of claim 10, further comprising creating the word-vector mapping model by mapping the corresponding vector values to the words of the first sentence and the words of the second sentences, based on a contextual meaning of the at least one word in the first sentence and contextual meanings of second words, which are obtained by translating the at least one word into the at least one different language, in the second sentences.

12. The multilingual translation method of claim 10, further comprising identifying languages corresponding to the words of the first sentence and the words of the second sentences, and creating the word-vector mapping model by mapping the corresponding vector values of the words of the first sentence and the words of the second sentences, based on the identified languages.

13. The multilingual translation method of claim 10, further comprising obtaining the first sentence by dividing a monolingual corpus written in the single language into a plurality of sentences.

14. The multilingual translation method of claim 10, further comprising:

creating a translation mapping table mapping words set based on a user input to words obtained by translating the set words into the at least one different language; and creating the second sentences by translating at least one word included in the set words among the words of the first sentence into the at least one different language by using the translation mapping table.

15. The multilingual translation method of claim 10, further comprising:

setting languages into which translation is to take place, based on a user input; and creating the word-vector mapping model, based on the set languages.

16. The multilingual translation method of claim 15, further comprising setting, as the target language, a language different from languages of the multilingual sentence among the set languages.

17. The multilingual translation method of claim 10, further comprising:

identifying languages corresponding to the words of the multilingual sentence; and obtaining the vector values corresponding to the words of the multilingual sentence, based on the identified languages.

18. The multilingual translation method of claim 17, wherein the identifying of the languages corresponding to the words of the multilingual sentence comprises identifying the languages corresponding to the words of the multilingual sentence, based on contextual meanings of the words of the multilingual sentence in the multilingual sentence.

* * * * *